(12) United States Patent
Fong

(10) Patent No.: US 7,997,544 B2
(45) Date of Patent: Aug. 16, 2011

(54) MOVABLE HAND/WRIST SUPPORT FOR USE WITH A COMPUTER MOUSE

(75) Inventor: Stephen Fong, Eagan, MN (US)

(73) Assignee: Stephen Fong, Eagan, MN (US)

( * ) Notice: Subject to any disclaimer, the term of this patent is extended or adjusted under 35 U.S.C. 154(b) by 1023 days.

(21) Appl. No.: 11/636,419

(22) Filed: Dec. 8, 2006

(65) Prior Publication Data

US 2007/0152110 A1 Jul. 5, 2007

Related U.S. Application Data

(60) Provisional application No. 60/748,650, filed on Dec. 8, 2005.

(51) Int. Cl.
*H04N 7/00* (2011.01)
(52) U.S. Cl. ..................... 248/118.5; 345/156
(58) Field of Classification Search .................. 248/118, 248/118.1, 118.5, 918, 346.03
See application file for complete search history.

(56) References Cited

U.S. PATENT DOCUMENTS

| | | |
|---|---|---|
| 4,313,585 A | 2/1982 | Bricker |
| 5,228,655 A | 7/1993 | Garcia et al. |
| 5,265,835 A | 11/1993 | Nash |
| 5,335,888 A | 8/1994 | Thomsen |
| 5,562,270 A | 10/1996 | Montague |
| 5,925,007 A | 7/1999 | Ashline |
| 5,944,289 A | 8/1999 | Speece |
| 6,099,934 A | 8/2000 | Held |
| 6,193,196 B1 | 2/2001 | Hesley |
| D444,791 S | 7/2001 | Liang |
| 6,585,198 B2 | 7/2003 | Dillon |
| 6,616,108 B1 * | 9/2003 | Brophy et al. ............ 248/118.1 |
| 6,644,695 B2 | 11/2003 | O'Malley |
| 6,932,304 B1 * | 8/2005 | Villamar .................... 248/118.1 |
| 6,962,311 B1 * | 11/2005 | Sykes .......................... 248/118 |
| 6,989,814 B1 * | 1/2006 | Mattson ....................... 345/156 |
| 2002/0125379 A1 | 9/2002 | Money et al. |
| 2003/0132359 A1 * | 7/2003 | Brophy .................. 248/346.01 |
| 2004/0089771 A1 * | 5/2004 | Pap ............................ 248/118.1 |
| 2005/0121562 A1 | 6/2005 | Baumgardner |
| 2005/0253028 A1 * | 11/2005 | Kennedy ...................... 248/118 |
| 2005/0253805 A1 * | 11/2005 | Kennedy ...................... 345/156 |

* cited by examiner

*Primary Examiner* — Amy J Sterling
*Assistant Examiner* — Erin Smith
(74) *Attorney, Agent, or Firm* — Patterson Thuente Christensen Pedersen, P.A.

(57) ABSTRACT

A movable hand/wrist support for use with a computer mouse is comprised of a flat and constant thickness sheet of material with an aperture there through. Aperture can be configured to be used with a mouse of any size or shape. Aperture may be configured to entirely surround a mouse so that it rests loosely within the aperture or it may be sized merely to allow the optical communication device of a mouse affixed to a top surface of movable support to communicate with an underlying surface. An secondary layer on which a mouse can rest loosely or be affixed can be affixed to a bottom surface of the sheet of material. Movable support may also include a forearm protector. Various layers may be affixed onto the sheet of material to provide additional comfort and support to the user. The hand/wrist support may be provided as a kit.

14 Claims, 16 Drawing Sheets

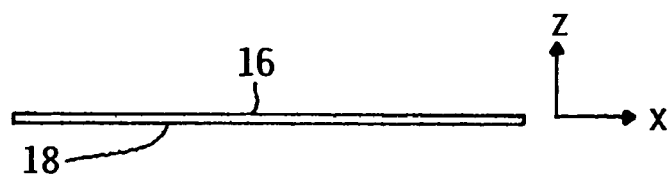
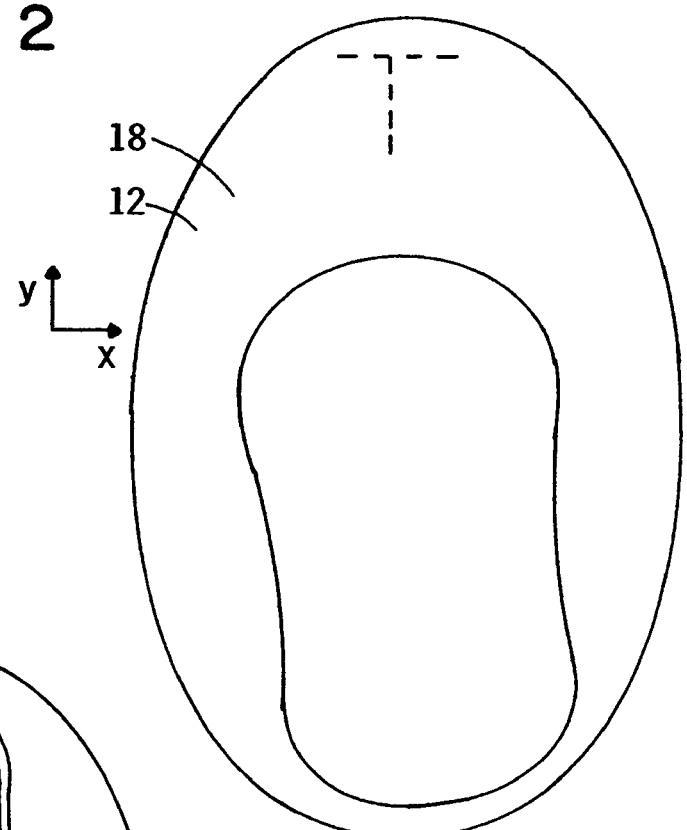
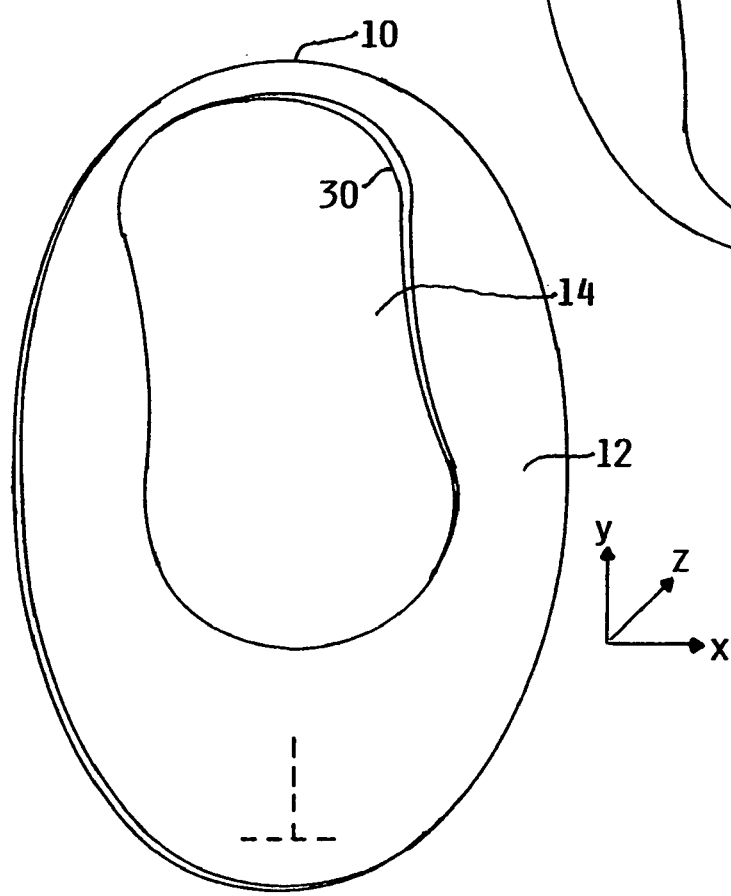
FIG. 2
FIG. 3
FIG. 1

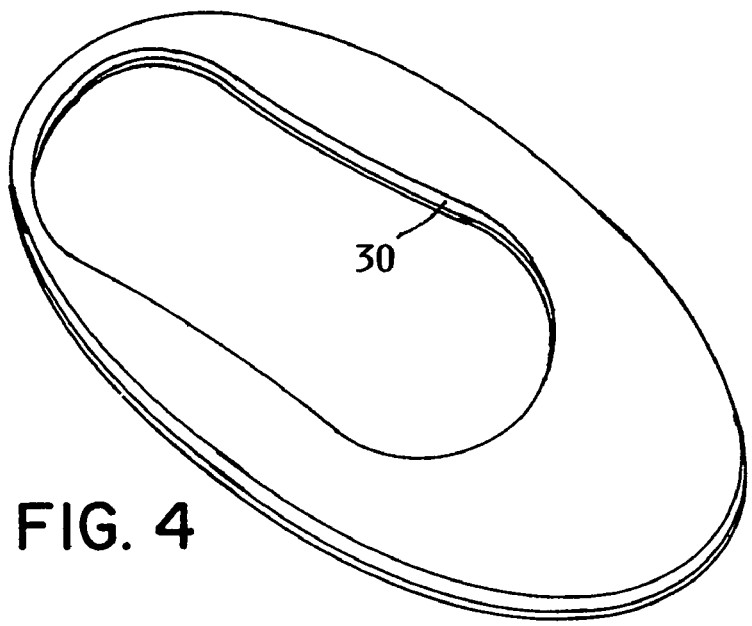
FIG. 4
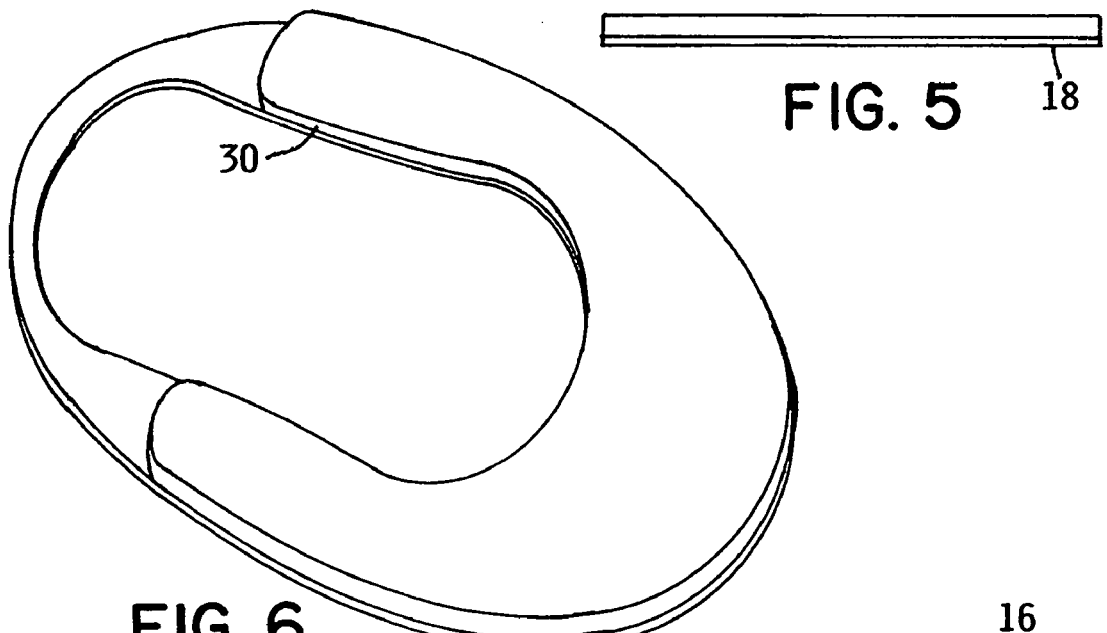
FIG. 6
FIG. 5
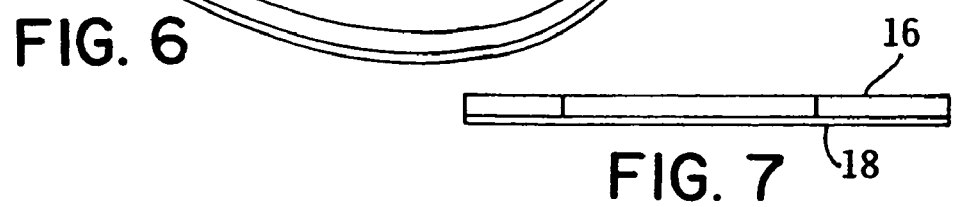
FIG. 7

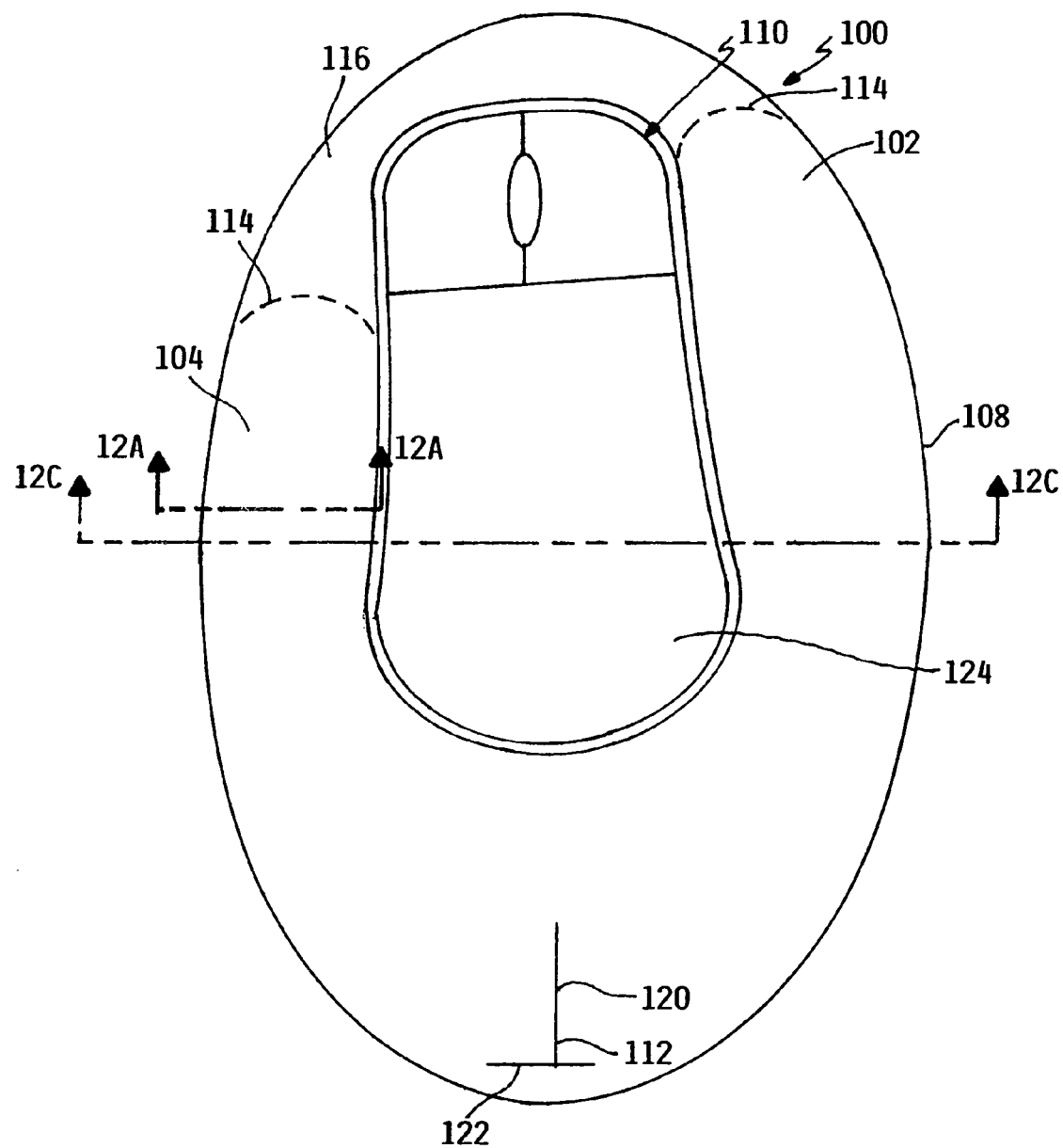
FIG. II

MOVABLE HAND/WRIST SUPPORT FOR USE WITH A COMPUTER MOUSE

RELATED APPLICATION

The present application claims the benefit of U.S. Provisional Application No. 60/748,650, filed Dec. 8, 2005, which is incorporated herein in its entirety by reference.

FIELD OF THE INVENTION

The present invention relates generally to the field of computer accessories and particularly to supports for use with a computer mouse or a similar input device.

BACKGROUND OF THE INVENTION

A mouse is a device for inputting data into a computer. A mouse sends positional and data selection information to the computer's processing unit. The mouse may be attached to the computer via a cable or it may use various cordless technologies to communicate with the computer. Although mice may differ in their exact style and configuration, their function and method of operation is almost always similar. To communicate with the computer, the user must move the mouse and click its buttons.

Many people use computers at their jobs and/or at home on a daily basis, often for long periods of time. When using a mouse, the user tends to balance the weight of his/her hand on the heel of the hand and to pivot on the heel of the hand to move the mouse laterally. The heel of the hand must also support the weight of the user's forearm. This applies significant pressure on the wrist. Such repeated or prolonged pressure on the wrist may pinch the carpal tunnel and irritate the medial nerve which passes through the carpal tunnel. Computer users are therefore often at risk for carpal tunnel syndrome, which can cause considerable discomfort and long term medical damage.

A mouse is generally operated with the heel of the hand and portions of the thumb and one or more other fingers in contact with the mouse pad, desk, or other surface on which the mouse is being operated. When a mouse is used for an extended period of time, these portions of the hand are constantly rubbing against the operating surface. The resulting friction can wear on the hand causing soreness and irritation of the skin. This problem is especially acute for those who play video games on their computers. Such users, especially those who play competitively over the internet, can often spend a number of consecutive hours playing games all the while moving the mouse back and forth.

There are a number of economically designed devices to support the wrist to help lessen the risk of carpal tunnel syndrome. Many such devices use a stationary wrist support, which reduces the ability to freely move the mouse. In addition, some of these devices strap the wrist in place, preventing the user from freely using the operating arm.

SUMMARY OF THE INVENTION

The invention as presented in a preferred embodiment is a movable hand and/or wrist support for using a mouse. Movable support is comprised of a planar and constant thickness pad comprised of one or more layers of material with an aperture at least partially there through. Aperture can be varyingly configured to be used with a mouse of any size or shape. Aperture may be configured to entirely surround a mouse so that it rests loosely within the aperture or it may be sized merely to allow the optical communication device of a mouse affixed to a top surface of movable support to communicate with an underlying surface. Where there is more than one layer the layers can have different size apertures. An underlayer on which a mouse can rest loosely or be affixed can be affixed to a bottom surface of the sheet of material. Underlayer can be vented to allow a movable support with a mouse affixed thereon to be more easily lifted from a work surface, for example, ventilation can be accomplished by providing sheet of material with vent holes. Movable support may also have an attached forearm protector. Various layers of different material may be affixed together to comprise the pad onto the sheet of material to provide additional comfort and support to the user. Cut lines may be provided to give the user the option of creating an open portion in movable support extending from the aperture through the perimeter of movable support or to accommodate for different sized mice.

An advantage of preferred embodiments is protection of the palm, fingers, and forearm from soreness and irritation from continuous mouse usage. Because palm, fingers, and forearm rest on movable support and forearm protector they remain in place and do not rub against the operating surface.

Another advantage of preferred embodiments is wrist protection and prevention of carpal tunnel syndrome and associated pain. The wrist rests in a comfortable position with the palm balanced on the movable support and the wrist need not pivot to move the mouse laterally. In addition, when the forearm is rested on the forearm protector the wrist does not have increased stress due to supporting the forearm's weight.

Another advantage of preferred embodiments is ease of use and reduction of friction. A mouse fits quickly and easily into movable support and movable support provides for low friction interaction with the operating surface. The friction generated by using a mouse in the conventional manner between the hand and the operating surface is completely eliminated and replaced with the low friction interaction between the movable support and the operating surface.

Another advantage of preferred embodiments is fatigue reduction. Because movable support glides easily over operating surfaces, little wrist action is needed for operation, and the hand and forearm are protected from rubbing against the operating surface so little wear is imparted on the body during use. This allows users to operate a mouse for greater periods of time.

Another advantage of preferred embodiments is customizability for individual needs. Movable support can easily be manufactured or adapted to various shapes and sizes to accommodate different mice, operating surfaces, and user preferences. Additionally, various layers can be added to movable support to provide maximum comfort and support for the user.

Another advantage of preferred embodiments is that the hand/wrist movable support provides stability to the mouse particularly where the mouse operation surface, that is the table, desk, or mouse platform, is inclined. In such cases, the mouse can slide down the incline from its own weight or as pulled by the cord. The movable support pad can buffer this undesired movement.

BRIEF DESCRIPTION OF THE FIGURES

The invention may be more completely understood in consideration of the following detailed description of various embodiments of the invention in connection with the accompanying drawings, in which:

FIG. 1 is a top perspective view of a movable mouse support according to an embodiment of the present invention.

FIG. 2 is an end view of the movable mouse support of FIG. 1.

FIG. 3 is a bottom view of a movable mouse support of FIG. 1.

FIG. 4 is a top perspective view of a movable mouse support according to an embodiment of the present invention.

FIG. 5 is an end view of the movable mouse support of FIG. 4

FIG. 6 is a perspective view of another embodiment of a movable support according to an embodiment of the present invention.

FIG. 7 is an end view of the movable mouse support of FIG. 6.

FIG. 11 is a top view of a movable support and mouse according to an embodiment of the present invention.

FIGS. 27A and 17B are views of a movable support according to an embodiment of the invention in a magazine cutout.

DETAILED DESCRIPTION

Figure 8:
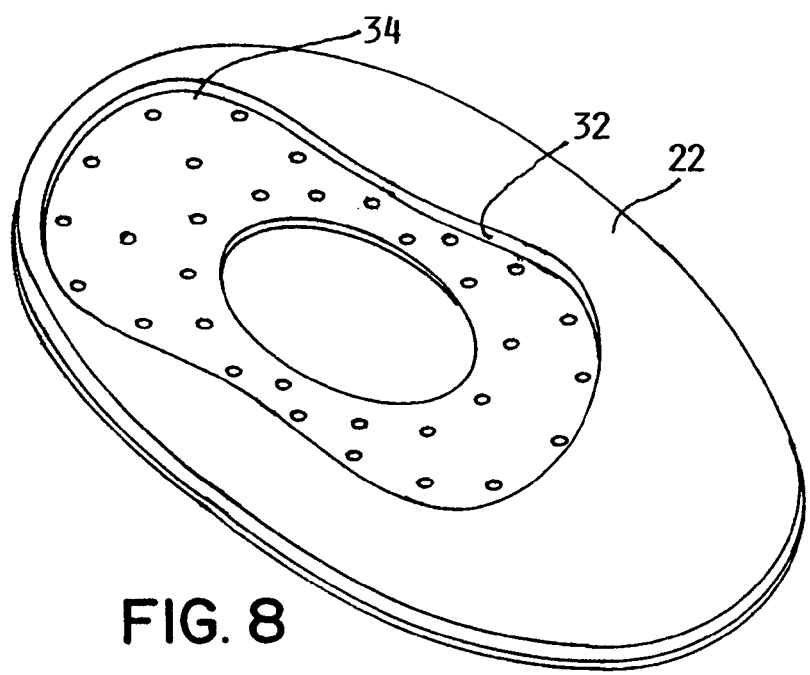
FIG. 8 is a left perspective view of a movable mouse support according to another embodiment of the present invention.
Figure 9:
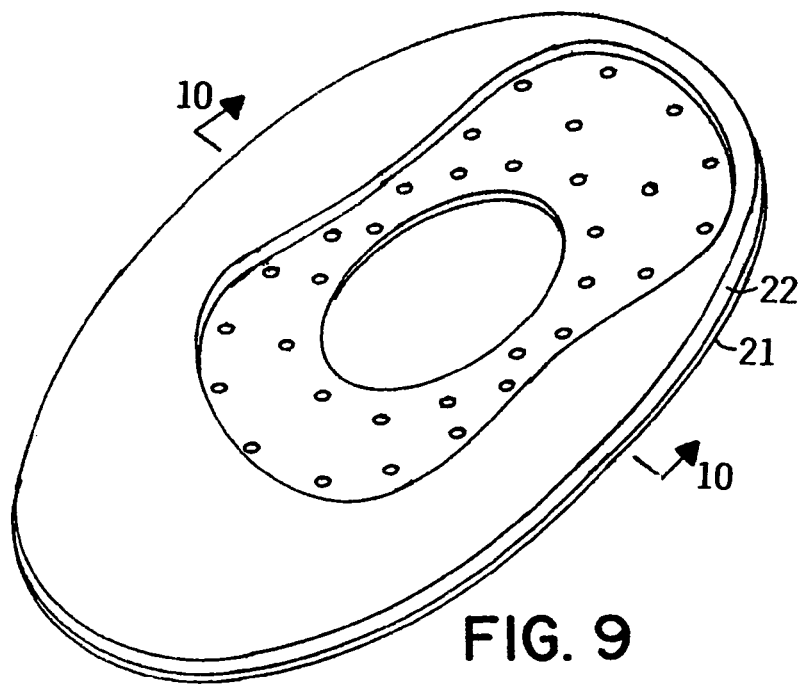
FIG. 9 is a right perspective view of the movable mouse support of FIG. 8.

Referring to FIGS. 1-10, several embodiments of the movable hand/wrist support 10 are illustrated. The support comprises a primary layer or first pad portion 12 and an aperture 14. The pad portion is preferably substantially oval in shape, for example, egg-shape, and is preferably at least 5½ inches in length and at least 4 inches wide. In a more preferred embodiment, the movable support will be 4.75 to 6.25 inches wide and 6.75 to 8.25 inches long. In preferred embodiments, the top surface 16 will be flat, that is, non-contoured, when unflexed or unloaded. The aperture is preferable sized to allow the mouse to loosely fit therein. In preferred embodiments, the aperture within which the mouse is received is oblong with a length of 4½ inches to 5.25 inches in length and 2½ to 3¾ inches in width. The pad portion will have a bottom facing surface 18 that provides low friction when interfaced with table top or other surfaces such as conventional hard mouse pads. The pad portion and hand/wrist support may be single layered as illustrated in FIGS. 1-3, or can have more than one layer as illustrated by the embodiments of FIGS. 4-10. The secondary or lower layer 21 will present the low friction surface and the upper layer 22 may present cushioning material for comfort and ergonomic advantage. The upper primary layer need not extend entirely around the mouse as shown in the embodiment illustrated in FIGS. 6 and 7. FIGS. 1-3 illustrate the x-y-z coordinate plan to be used as a frame of reference with respect to the invention herein.

The three embodiments of FIGS. 1-10, capture the mouse so that as the mouse is moved, the hand/wrist support will move with same by way of the engagement of the inwardly facing surface 30 of the pad with the lower portion of the mouse. With reference to the embodiment of FIGS. 8-10, the inside facing surface 32 of the upper cushioning layer 22 as defined by the aperture 34 provides the impetus for the pad to follow the mouse. The thickness or height of the inwardly facing surface, that is, the mouse abutting surface, is preferably 0.05 inches or more to minimize the mouse from running up over the inwardly facing surface at the aperture. The overall thickness of the pad is preferably 0.7 inches or less or in more preferred embodiments 0.5 inches or less.

Figure 12A:
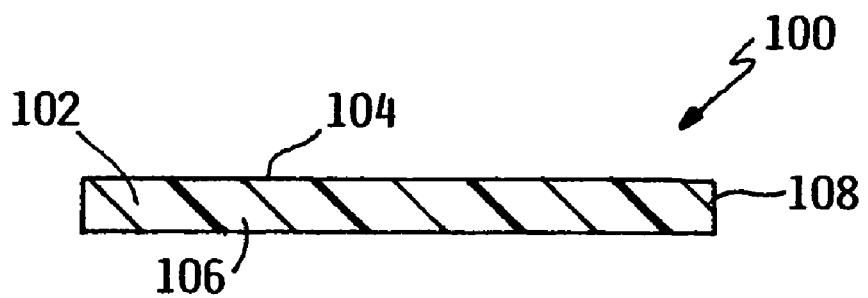
FIG. 12A is a cross section view of a movable support according to an embodiment of the present invention taken at line 12A-12A of FIG. 11.

Referring to FIGS. 11 and 12A there can be seen a movable support 100 according to an embodiment of the present invention with a mouse 124 placed inside. Movable support 100 comprises a stiff, flexible, and resilient portion of a sheet of material defining a primary layer 102 of nominal thickness with an aperture 110 there through. As shown in FIG. 12A, sheet of material layer 102 is also a constant thickness. Primary layer 102 comprises a top surface 104 and a bottom surface 106 with a perimeter there around 108. Primary layer 102 is preferably made from a material that is stiff, yet flexible and resilient and that can slide easily across most desk-type surfaces. "Stiff" when used herein means that the material will support its own weight, with less than 3" deflection in cantilever loading, when cut to the size of a mouse pad, for example, 6 inches in length and 5 inches in width and clamped 1 inch at one end. For most polymeric materials, a thickness of at least about 0.020 inches will provide sufficient rigidity. Use of sheet materials less stiff may also be suitable, particularly where the pad has more than one layer. Preferably, primary layer 102 is made of a polymer material with a very low coefficient of friction with respect to most surfaces on which such a mouse would be used, for example: finished and unfinished wood, laminated table tops, and mouse pads. Generally sheet materials of vinyls, nylons, polyethylenes, and fluoropolymers are the types of low friction polymers believed to be suitable.

Figure 12B:
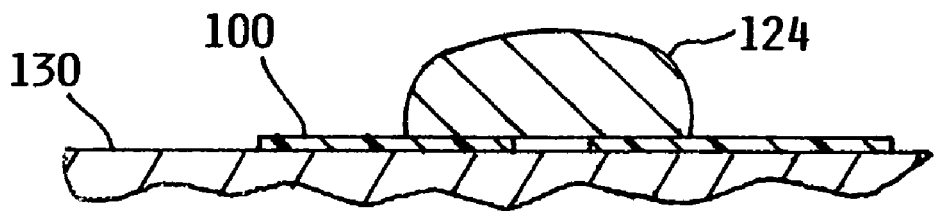
FIG. 12B is a cross section view of a movable support and mouse according to an embodiment of the present invention.
Figure 12C:
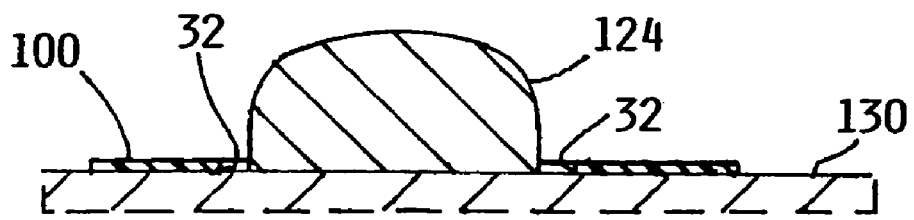
FIG. 12C is a cross section view of a movable support and mouse according to an embodiment of the present invention.

As seen in FIGS. 11 and 12C, mouse 124 may be loosely placed within aperture 110 such that both the mouse 124 and the movable support 100 are in complete contact with the operating surface 130 on which they are being used. This allows smaller, micro-movements to be made with slight wrist movements of the mouse 124 within the aperture 110 without the need to move movable support 100. Larger, coarse or macro-movements are made by moving the mouse along with movable support 100. Aperture 110 can be sized to accommodate mice of any size and shape. In a preferred embodiment the gap between the mouse and inside facing surface 32 will be at least 1/32" all around the mouse when the mouse is centered in the aperture and less than 5/8". In a more preferred embodiment the gap will be at least 3/32" when centered and less than 3/8". Stated differently, the mouse can have laterally or vertically in the x-y direction preferably at least 1/8" without requiring movement of the hand/wrist support.

Figure 13:
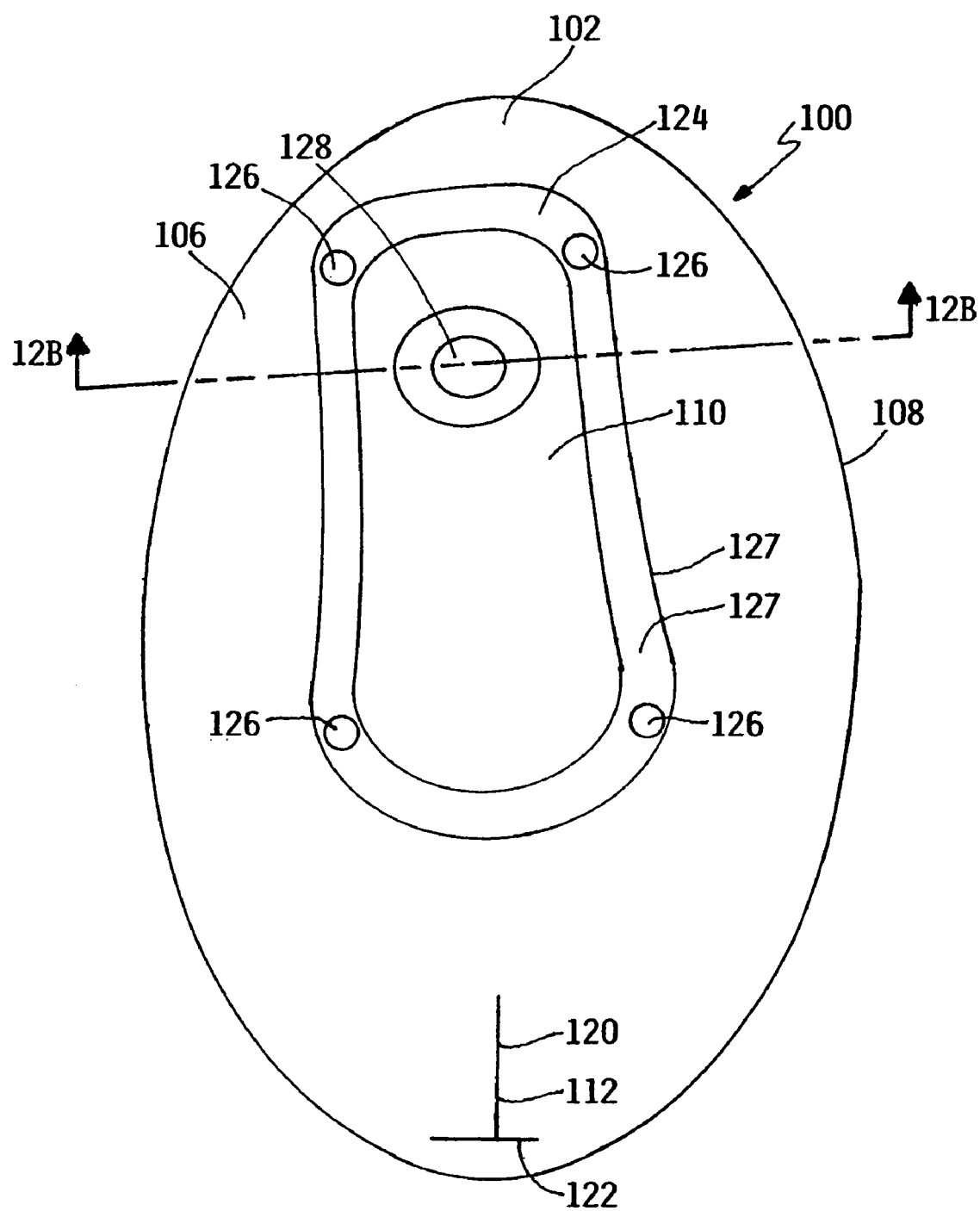
FIG. 13 is a bottom view of a movable support according to an embodiment of the present invention with a mouse affixed thereto.
Figure 14:
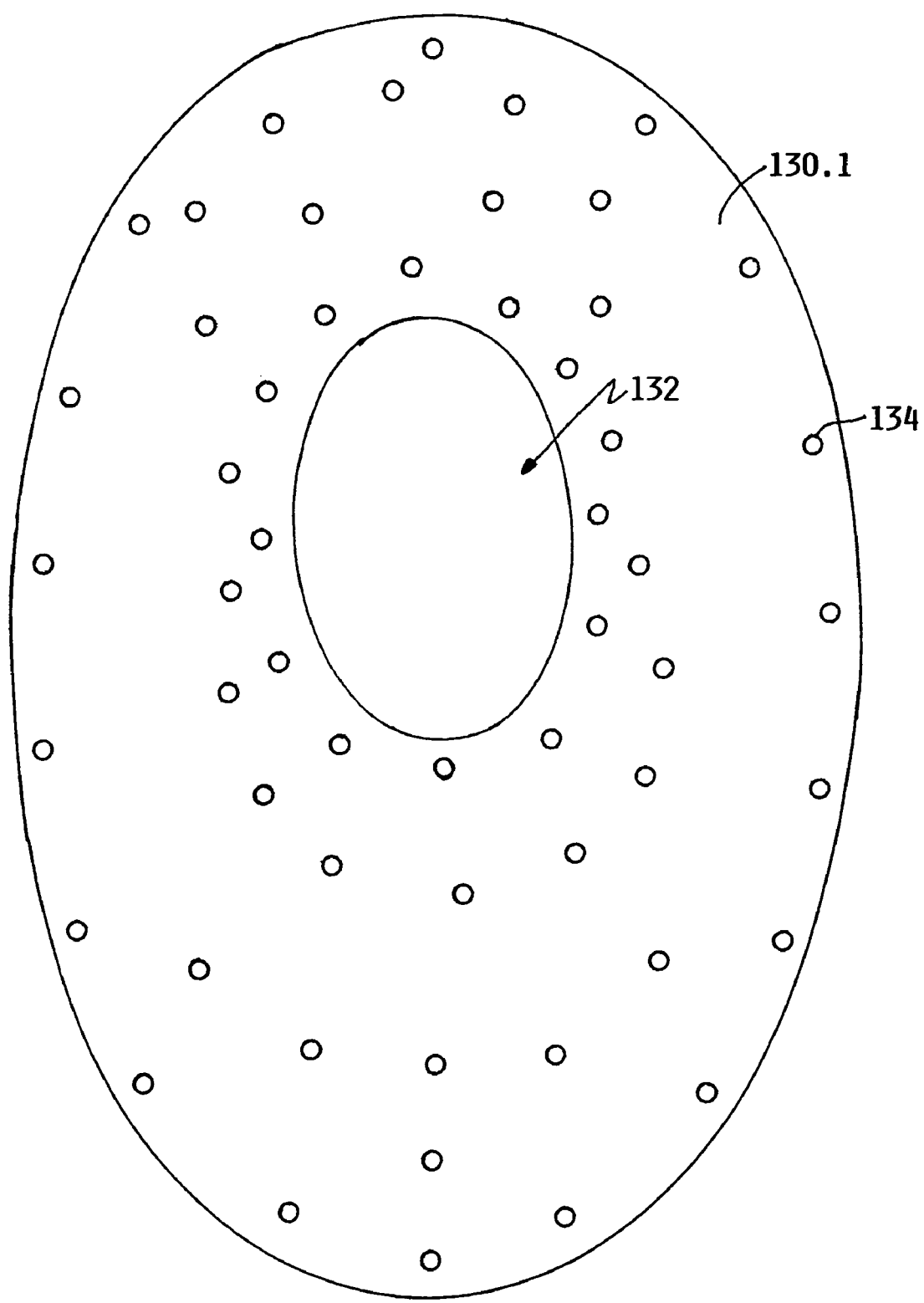
FIG. 14 is a top view of an underlayer that can be used with a movable support according to an embodiment of the present invention, the bottom view being a mirror-image thereof.
Figure 15:
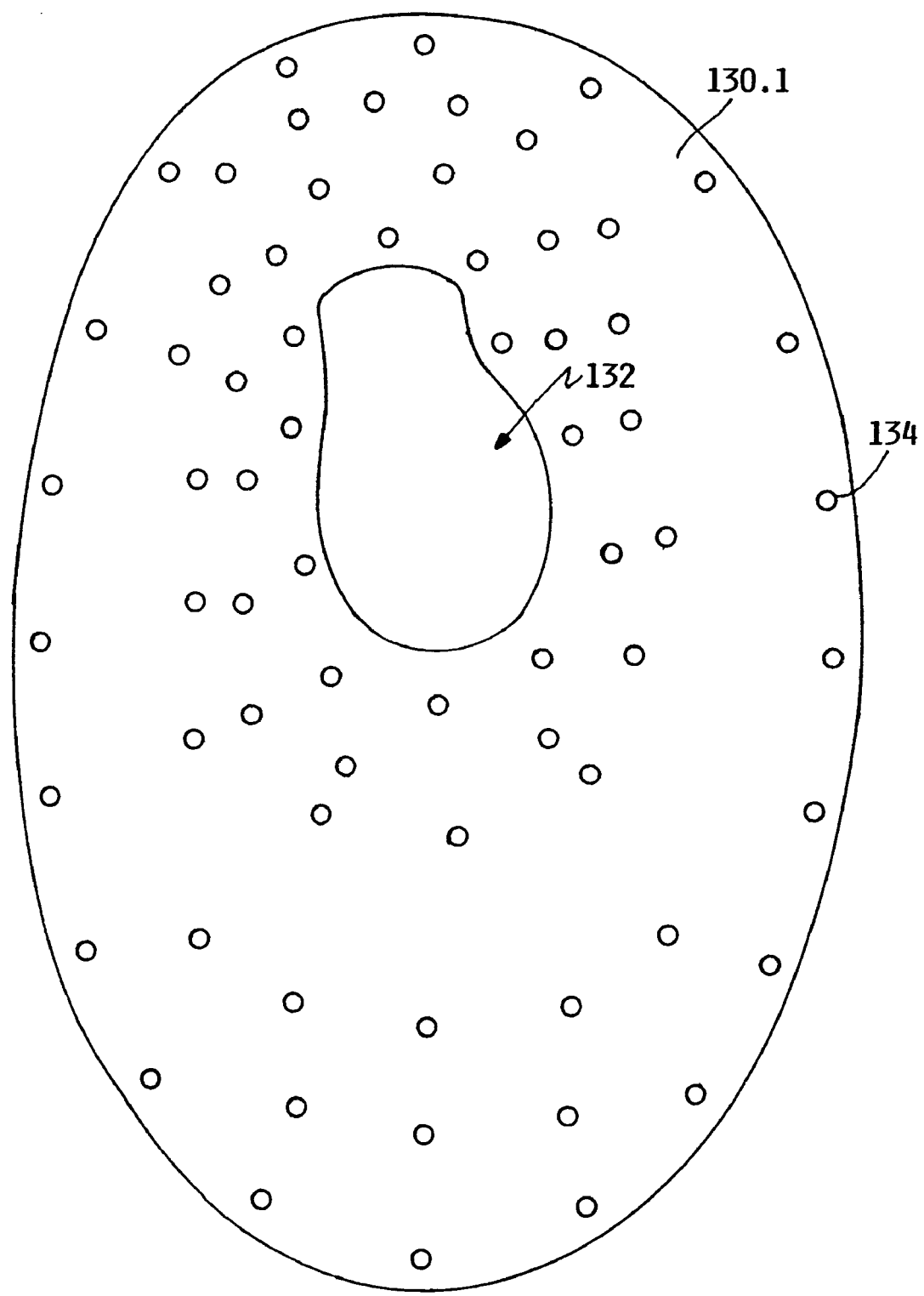
FIG. 15 is a top view of an underlayer that can be used with a movable support according to an embodiment of the present invention, the bottom view being a mirror-image thereof.

Alternatively, as shown from a bottom view in FIG. 13, mouse 124 may be secured to primary layer 102 to allow for greater cooperation between mouse 124 and movable support 100. This view illustrates a transparent primary layer allowing the mouse to be seen therethru. Mouse 124 can be affixed to primary layer 102 by a puddy 126 or other adhesive, e.g., silicone or tape with two sticky sides, provided to the base 127 of the mouse 124 inside the periphery 127.1 of the mouse. So long as the communication means 128, for example, a laser l.e.d. or rollerball, of the mouse 124 remains unobstructed the mouse 124 will continue to function properly. To affix a mouse 124 to movable support 100 in this manner, it is necessary that the mouse 124 be larger than the aperture 112 or at least that portions of the movable support 100 extend under the mouse 124. FIG. 12B shows a cross section of a mouse 124 larger than the aperture and secured to the top surface of movable support 100. In such an embodiment, the movable support is not movable with respect to the mouse and effectively and operably functions as one with the mouse.

Referring to FIGS. 8, 9, 10, 14 and 15, movable support 100 can be multiple layered, for example, be provided with an underlayer 130.1 affixed to the underside of primary layer 102. Secondary layer or underlayer 130 can also be comprised of a stiff, constant thickness sheet of material. Underlayer 130 can be provided with an aperture 132 sized to allow the communications means of a mouse to function with the surface below. Aperture 132 can be given various configurations to accommodate for the size and location of the communications means of various mice, that is, laser l.e.d.'s, rollerballs, and varying positioning of same. Underlayer 130 can also be provided with a plurality of vent holes 134. Vent holes 134 can be provided in various shapes, sizes, locations, and configurations. Preferably, a mouse will fit entirely within the aperture 110 of primary layer 102 and rest upon the underlayer 130 with its communications means aligned with the aperture 132 of underlayer. Underlayer 130 provides a uniform, low friction surface for micro-movements of mouse to be carried out on. Mouse can also be affixed to an upper surface of underlayer 130.1 with a putty or adhesive as described above. Ventilation provided by vent holes 134 can serve to decrease the suction force between the movable support 100 and the underlying work surface so that an attached mouse and movable support 100 can be more easily removed from the surface. As an alterative to a separate, vented underlayer 130.1, sheet of material can instead be provided with vent holes 130 if ventilation is desired. Alternatively, ventilation can be provided by fine wrinkles or grooves in the bottom facing surface.

Figure 16A:
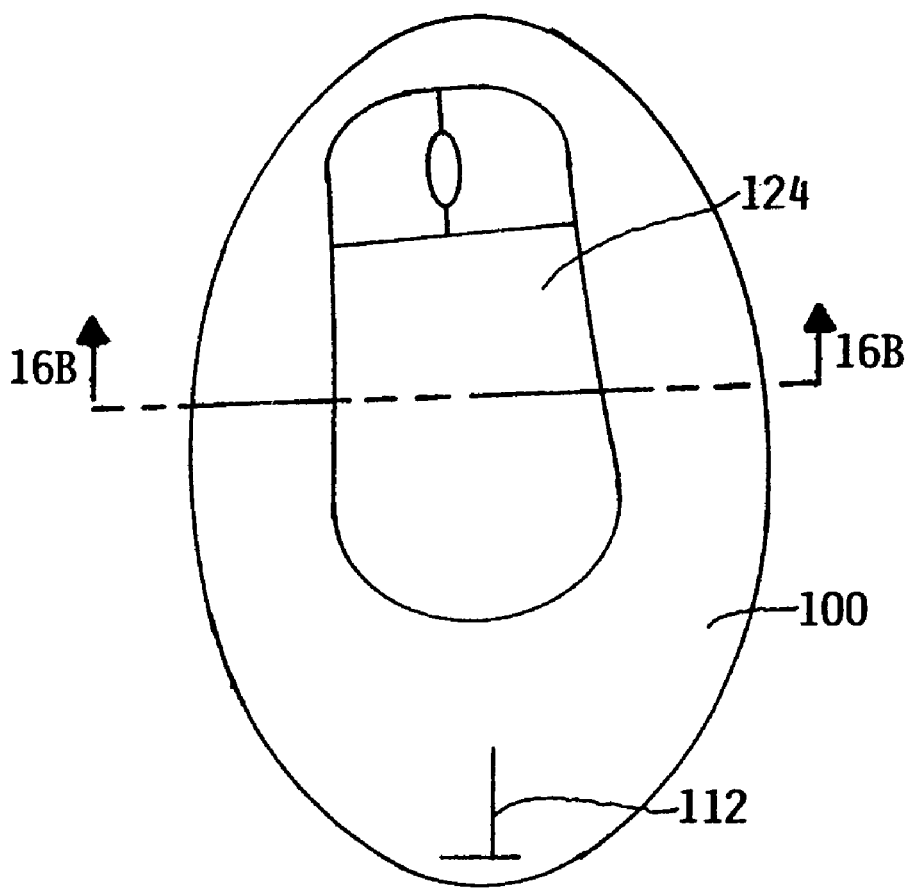
FIG. 16A is a view of a movable support according to an embodiment of the present invention with a mouse affixed thereto.
Figure 16B:
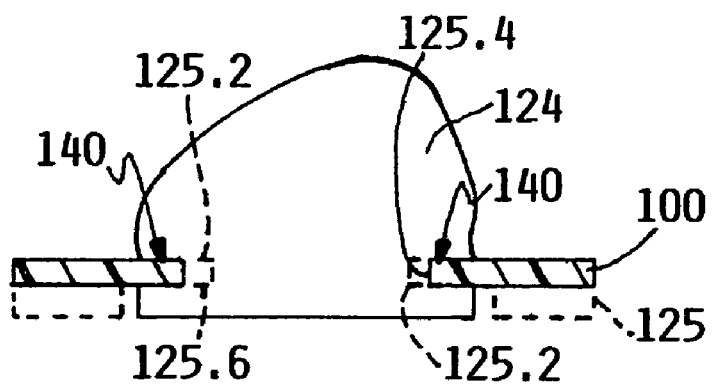
FIG. 16B is a cross section view of the movable support and mouse shown in FIG. 6A.

Referring to FIGS. 16A and 16B, mouse 124 may also be secured to movable support 100 by a groove or slots 140 in the side of the mouse 124. This embodiment may also have multiple layers 125. Moreover, the movable support can be loosely fit, as indicated by gaps 125.2 between the inwardly facing edge 125.4 of the movable support and the abutting surface 125.6 of the mouse. Preferred configurations of this embodiment could have the slots or groove 14 extending entirely or partially around the periphery of the mouse. Those of skill in the art will recognize that mouse 124 may be attached to movable support 100 by any other available means, for example mouse 124 may be tethered to movable support 100 by a string, piece of elastic, piece of flexible plastic, resilient material, coiled spring or the like that is attached to movable support 100 through slot 112 or through a small aperture in the primary layer 102.

Figure 17A:
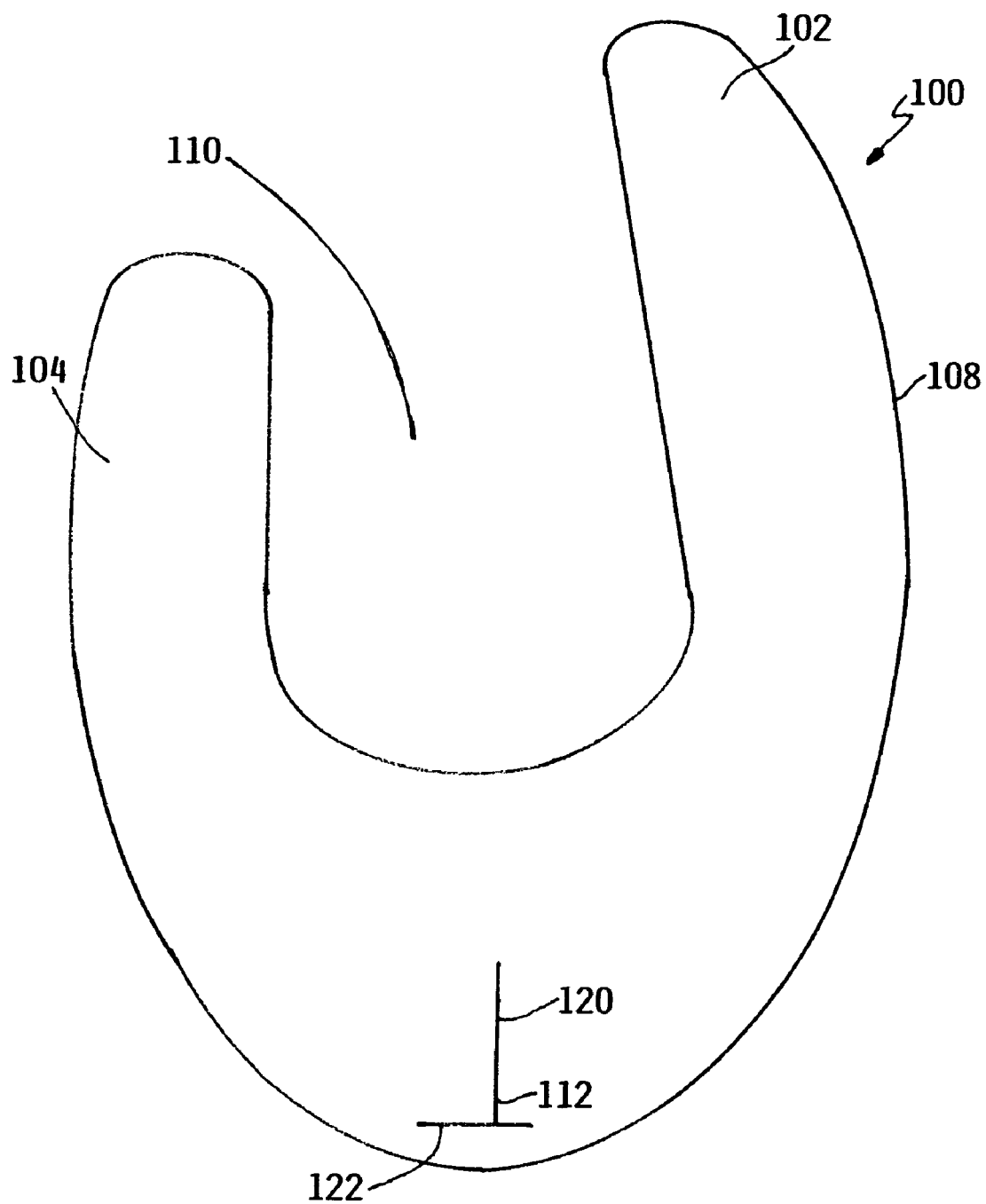
FIG. 17a is a top view of a movable support according to an embodiment of the present invention.
Figure 17B:
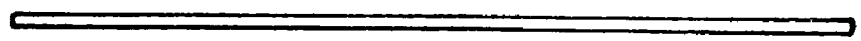
FIG. 17b is an end view of a movable support according to an embodiment of the present invention.
Figure 18:
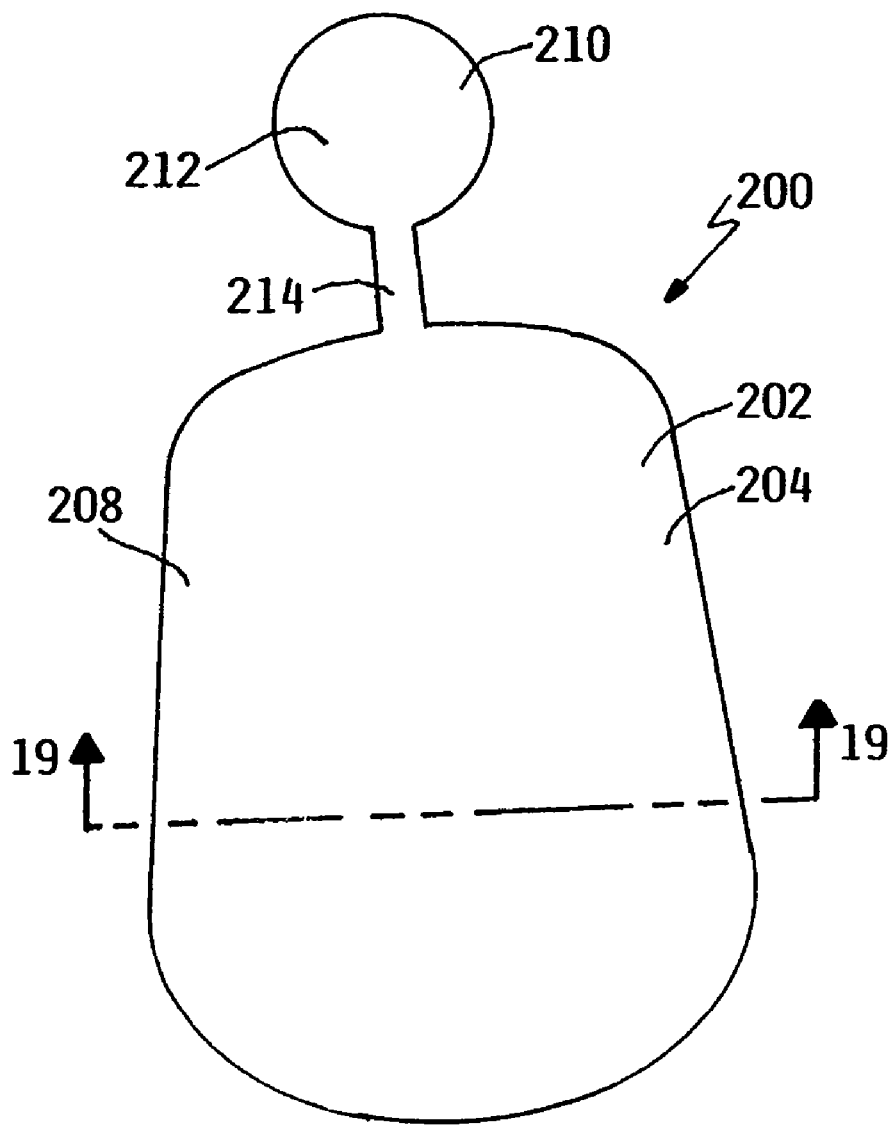
FIG. 18 is a top view of a forearm protector add-on usable with a movable support according to an embodiment of the present invention.
Figure 19:
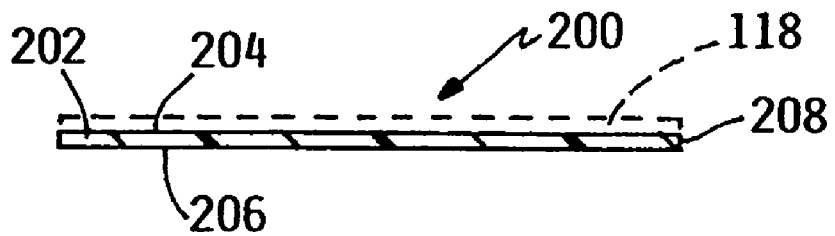
FIG. 19 is a cross section view of a forearm protector add-on usable with a movable support according to an embodiment of the present invention.
Figure 20:
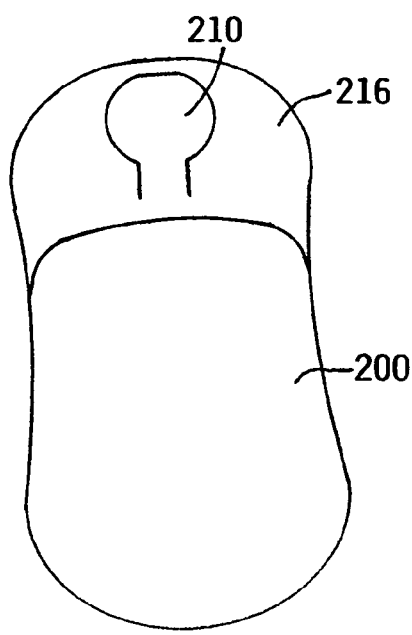
FIG. 20 is a top view of a forearm protector add-on usable with a movable support according to an embodiment of the present invention.
Figure 21A:
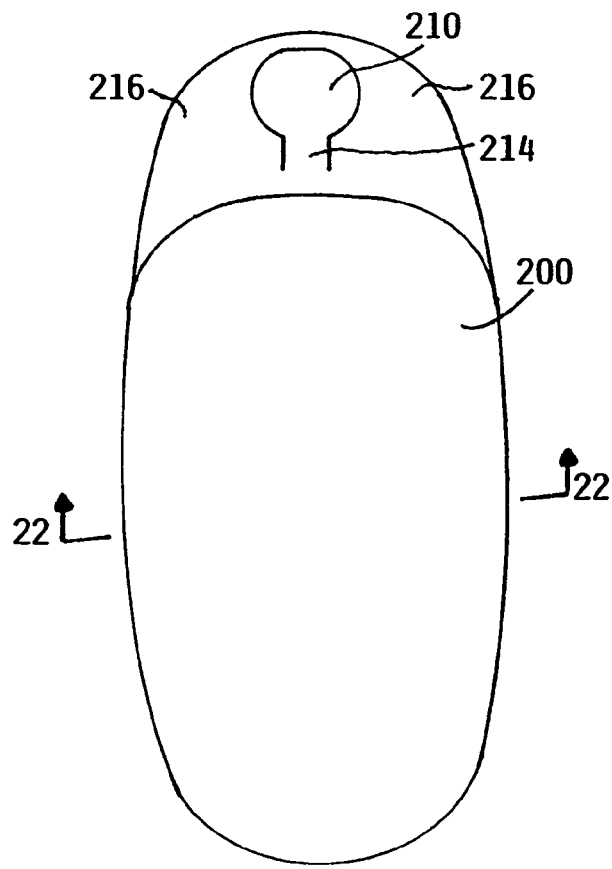
FIG. 21A is a top view of a forearm protector add-on usable with a movable support according to an embodiment of the present invention.
Figure 21B:
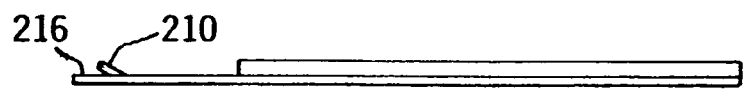
FIG. 21B is an end view of a forearm protector add-on usable with a movable support according to an embodiment of the present invention.

Movable support 100 can also include one or more cut lines 114. This gives the computer user the option of cutting away a removable portion 116 of movable support 100 to create an open end in aperture 110. This configuration is depicted in FIGS. 17a and 17b and serves at least two distinct advantages. First, it allows a mouse to be inserted or removed from movable support 100 more easily because it does not have to be lifted from the operating surface. Second, where a mouse with a cord is used, it reduces interference between the cord and movable support 100. Cut lines 114 may simply be lines printed or otherwise disposed onto primary layer 102 or may be perforations or other means by which the user may detach removable portion 116 by hand. Preferably, the movable support 100 may be suitable for cutting with common scissors. A scissors starter hole may be provided interior from the perimeter 108 of the movable support 100. Although FIG. 11 depicts only a single set of cut lines 114, movable support 100 may be provided with additional sets of cut lines thereby defining removable portions of varying sizes to guide the user in configuring the movable support 100 to fit mice of any size and shape. A number of different cut lines 114 can be individually identified by labeling as being for specific sizes or brands of mice. Alternatively, movable support 100 may be produced and sold without removable portion, already in the configuration shown in FIG. 17.

Referring to FIGS. 1, 17A, 18, 19 and 26C, movable support 100 may also include a slot 112 of, for example, an inverted T-shape, which includes a vertical slit in the y direction 120 and a horizontal slit 122 in the x direction, into which forearm protector or support 200 may be connected. Referring to FIGS. 18, 19, 21A, 21B, 26C, and 27C, forearm protector 200 is comprised of a portion of primary layer 202 of preferably nominal, constant thickness having a top surface 204 and bottom surface 206 with a perimeter there around 208. Forearm protector 200 further includes an attachment portion 210 which is comprised of an insertion portion 212 and pivot portion 214. To use forearm protector 200 with movable support 100, insert portion 212 of attachment portion 210 is inserted into vertical slit 120 of slot 112. Pivot portion 214 of attachment portion 210 can change position along horizontal slit 122 thereby allowing forearm protector 200 to pivot relative to movable support 100. Forearm protector 200 provides similar support and protection for a user's forearm that movable support 100 provides for a user's hand. In addition, because forearm protector 200 allows and encourages a user to rest his/her forearm on the work surface, the wrist is not put under extra strain by having to support the weight of the forearm.

Referring now to FIGS. 20, 21A, 21B, and 26C, forearm protector 200 can include shoulders 216 around attachment portion 210. Shoulders 216 help further protect a user's wrist when the user's forearm is resting on forearm protector 200. As evident, forearm protector 200 can be made in varying lengths, widths, and sizes to accommodate the needs of a user or manufacturing convenience.

The forearm protector 200 may also be used by itself as a palm support when used with very small mice, such as those marketed to laptop users. With such mice, the user tends to rest the palm on the work surface, manipulating the mouse by only moving the fingers. Because the palm is stationary, a movable support 100 is not necessary in such situations. However, it may still be desirable to provide support for the palm. Forearm protector 200 can be affixed to the mouse or merely rest on the work surface behind the mouse to provide palm support.

Figure 10:
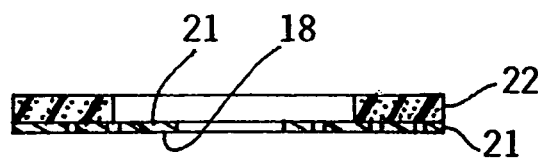
FIG. 10 is a cross-sectional view taken at line 10-10 of FIG. 9.
Figure 22:
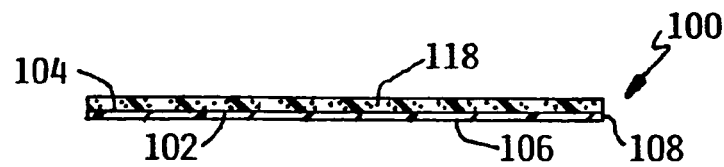
FIG. 22 is a cross section view of a movable support according to an embodiment of the present invention.

As shown in cross section in forearm support 200 and FIGS. 10 and 22, movable support 100 may also include additional cushioning layers 22, 118 to better and more comfortably support a user's hand, wrist, and forearm. As illustrated in FIGS. 5 and 6, the upper layer 22 may have an aperture conforming to the aperture 110 of the primary layer 102 also create a thicker aperture that helps prevent the mouse from accidentally slipping out of the aperture 110. Layers may also be used with forearm protector 200 when used alone or in conjunction with movable support 100. Although FIG. 22 shows a single layer 118 affixed to top surface 104 of primary layer 102, any number of layers in any thickness may be attached and layers may also be attached to the bottom surface 106 or around the perimeter 108 of the primary layer. Layers 118 can be made out of any number of materials, including leather, suede, microfiber, foam, memory foam, rubber, carbon fiber, or a gel filled material. Any number or combination of layers can be added such that the user has the desired thickness, hardness, and texture.

Additional layers 118 may be affixed to primary layer 102 or other layers 118 by any adhesive method. Layers 118 could be provided with an adhesive and a peel off backing, whereby the user would simply remove the backing and place the layer 118 onto primary layer 102. Alternatively, it may be desirable to affix layers 118 in a less permanent manner, such as with two-sided tape, in order to allow for interchangeability of layers 118. A layer 118 can cover the entire surface of the movable support 100 or can cover only a sufficient area such that a user's hand rests on the layer 118. Layers may also be provided with one or more sets of cut lines similar to those that may be provided to the primary layer to facilitate adapting the layers to fit mice of different shapes and sizes. Additional layers, particularly where the top layer is transparent, may have decoration thereon and provide a means for insertion of paper sheet material such as photographs in between layers.

Figures 23, 24:
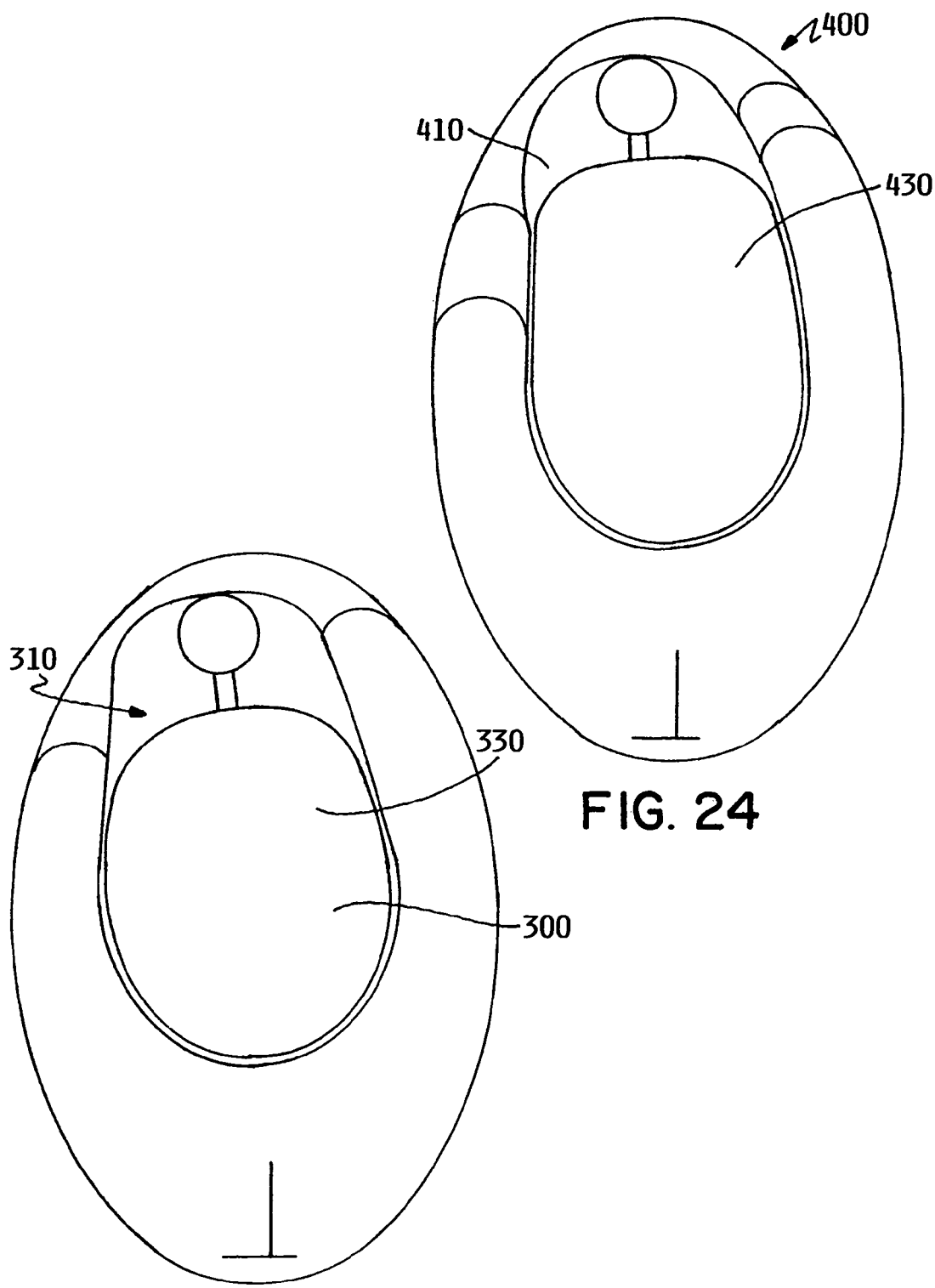
FIG. 23 is a top view of a movable support and forearm protector according to an embodiment of the present invention.
FIG. 24 is a top view of a movable support and forearm protector according to an embodiment of the present invention.
Figure 25:
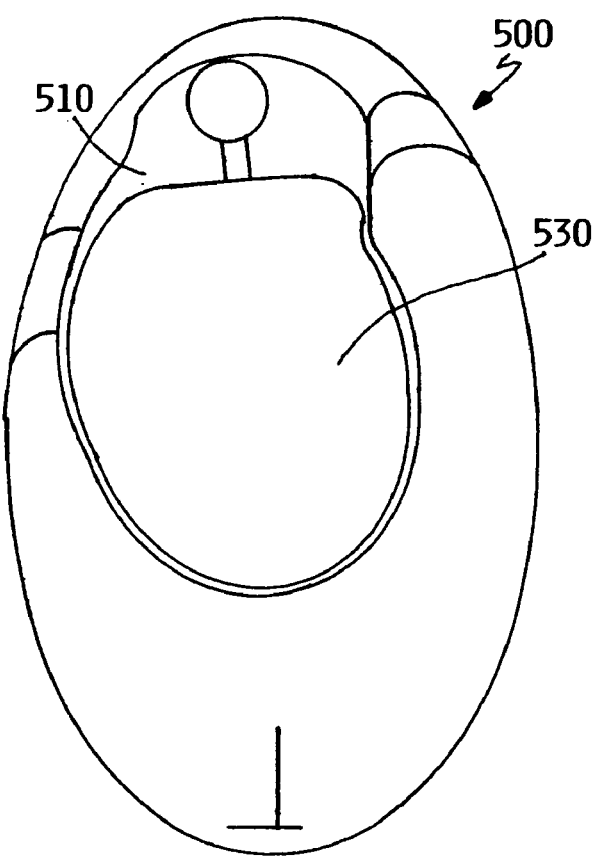
FIG. 25 is a top view of a movable support and forearm protector as same could be packaged before assembly according to an embodiment of the present invention.

Movable support 100 and forearm protector 200 may be given various sizes and shapes to accommodate the needs of the user. Aperture 110 can be sized to accommodate a mouse, or just the communication portion of a mouse, of any shape and size. For example, FIGS. 23-25 show various embodiments of movable mouse support 300, 400 500 having differently shaped and sized apertures 310, 410, 510. Each movable support 300, 400, 500 may also be provided with a forearm support 330, 430, 530 shaped such that it can be packaged within its respective aperture 310, 410, 510. The disclosed movable supports 100, 300, 400, and 500 are believed to be able to be used with all available mice. However, movable support can easily be modified to accommodate any other size or shape of mouse. Alternatively, a single movable support may be provided with cut lines outlining various different aperture shapes so that the user can choose the aperture best shaped for the user's mouse.

The perimeters of movable mouse support and forearm protector may also be shaped to provide maximum comfort based on a user's hand profile and manner of operating a mouse. Perimeters can also be designed to accommodate operating surfaces of varying shapes and sizes. Additional cut lines or perforations may be included on the top surface 104 of the primary layer 102 in order to guide the user in trimming movable support 100 to a desired size.

Movable support 100 may be used with ball, optical or mice using any other means of communication. Movable support 100 may also be used with either cordless mice or mice having cords and with or without a mouse pad. When grasping the mouse 124, the user rests the heal, thumb, and one or more fingers on movable support 100 as depicted in FIG. 26. If a forearm protector 200 is provided, the user rests the forearm on forearm protector 200. The user is then free to control the mouse 124 restraint free and with increased comfort and support. The primary layer 102 or underlayer 130 interacts with the operating surface in a low friction manner, so that mouse 124 movement is uninhibited. Movable support 100 may be used with a mouse 124 controlled by either the right hand or the left hand simply by flipping movable mouse pad 100 over.

Movable support 100 may be provided to the consumer individually or in a kit. A movable support kit could include one or more sheets of material 102 in various shapes and sizes, possibly with at least one having removable portion 116 intact and at least one having removable portion 116 removed. One or more forearm protectors 200 and underlayers 130 in various shapes and sizes may also be included. The kit can also contain a plurality of layers in various shapes, sizes, thicknesses, and made of various materials. Kit may also provide a means for affixing layers 118 together into a laminate and to sheets of material 102 and a tool for cutting away removable portion 116 or altering the size and shape of layers 118, primary layer 102, or forearm protector 200.

Figure 27A:
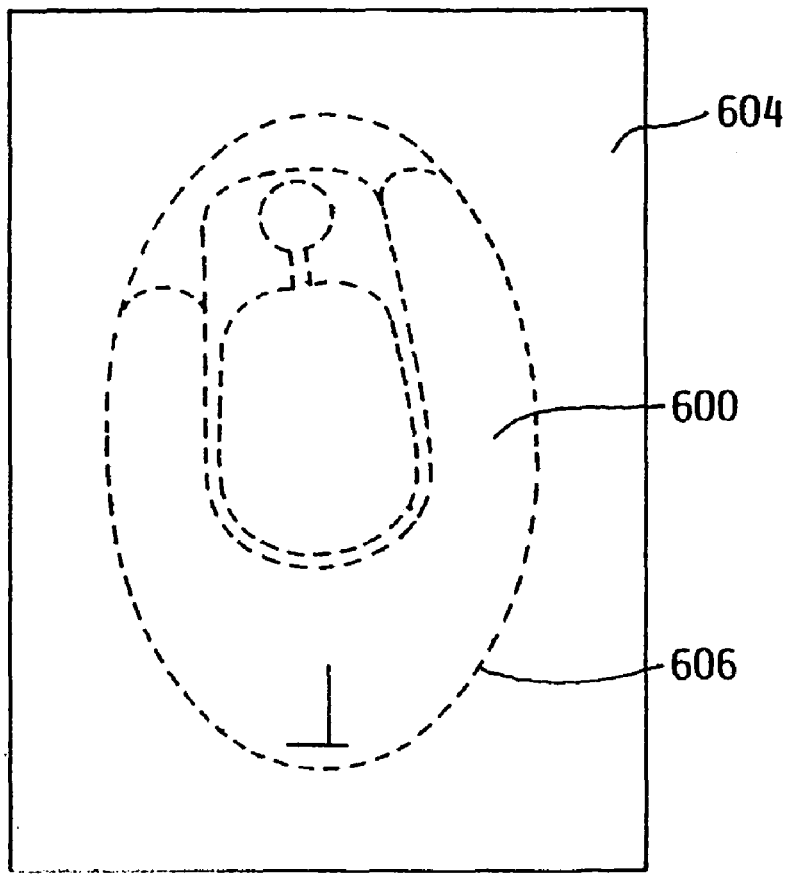
Figure 27B:
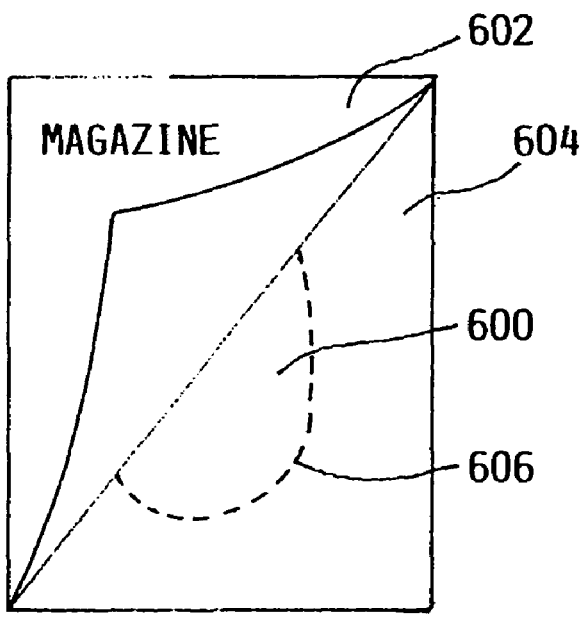

Referring to FIGS. 27A and 27B, movable support 600 can also be easily and conveniently distributed in a magazine 602. Distribution of mouse pads in such a media are known, see U.S. Pat. No. 6,644,695("the '695 patent), which is incorporated herein by reference. A movable support 600 of nominal thickness allows it to be placed on a single page 604 or insert of a magazine 602. A consumer receiving the magazine can easily remove movable support 600 with perforations 606 provided in the page 604 or by cutting along a provided line. The individual components of movable support can all be provided with perforations 606 to provide for easy disassembly. Movable support can also be inserted in a magazine as disclosed in the '695 patent. Alternatively, movable support can be distributed loosely in a magazine much like the subscription postcards that are currently distributed in magazines. It will be appreciated by one of skill in the art that this type of distribution can be done with numerous other types of media, including newspapers, books, and flyers.

Figure 28:
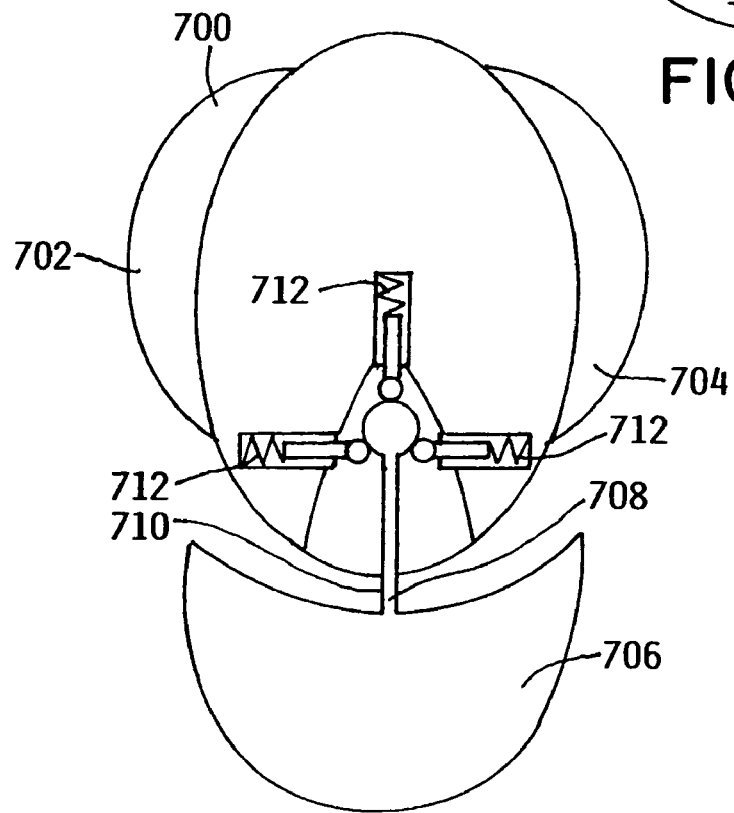
FIG. 28 is a bottom view of a movable support according to an embodiment of the present invention.

Referring to FIG. 28 there can be seen a movable support 700 according to an embodiment of the present invention where movable support 700 comprises multiple pieces integrally formed with a mouse 720. A thumb wing 702 and a finger wing 704 are attached to the mouse 720. Thumb wing 702 and finger wing 704 may be permanently attached to the mouse 720, or they may be detachable. A palm wing 706 may also be included. Palm wing 706 is attached to mouse 720 by an attachment portion 708. The shaft 710 of attachment portion 708 allows the palm wing 706 to pivot about the mouse 720. Three spring loaded pistons 712 abut attachment portion 708 to bias palm wing 706 back to a neutral position.

Figure 26A:
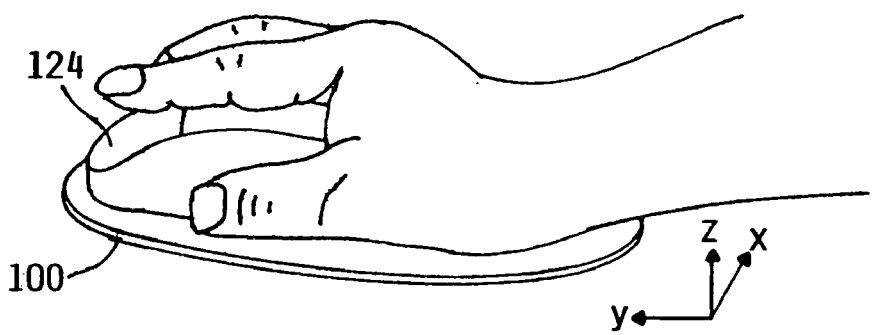
FIG. 26a is a perspective view of a user operating a mouse with a movable support according to an embodiment of the present invention.
Figure 26B:
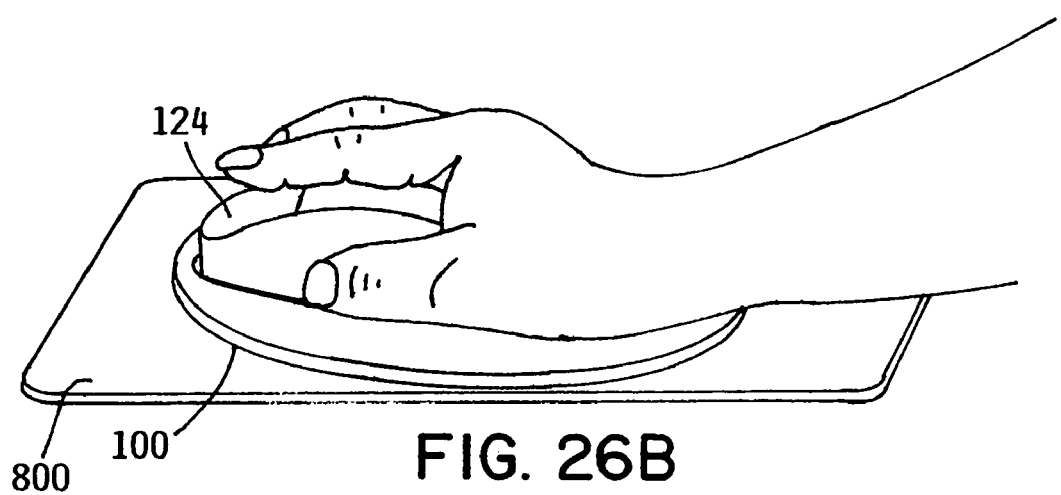
FIG. 26b is a perspective view of a user operating a mouse with a movable support on a mouse pad according to an embodiment of the present invention.
Figure 26C:
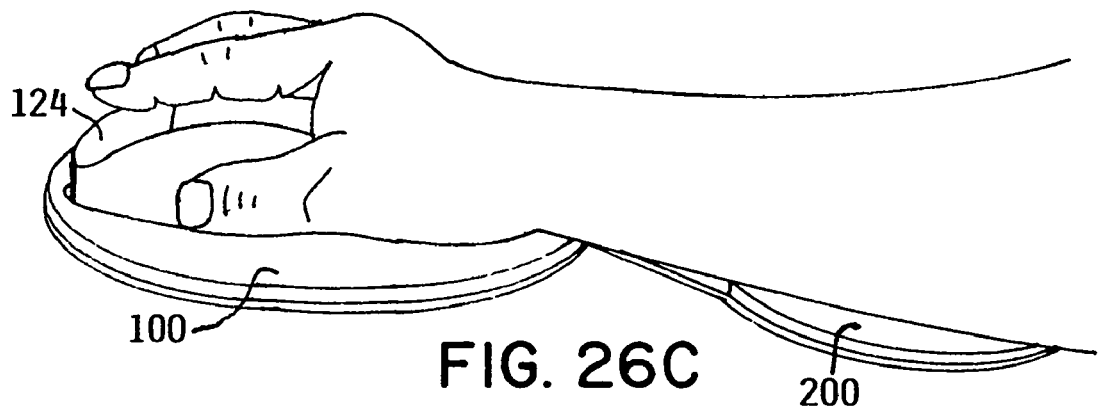
FIG. 26c is a perspective view of a user operating a mouse with a movable support and forearm support according to an embodiment of the present invention.

Referring to FIGS. 26A, 26B, and 26C, the invention also includes a mouse 124 in combination with the movable support 100 in the various embodiments included herein. These views illustrate how the heel of the hand rests on the hand/wrist support. The combination may also include a mouse pad 800. In such an embodiment, the movable support material and mouse pad material may be selected to provide the desired low friction interaction with respect to each other. The invention also includes the method of use of said mouse in association with the hand/wrist supports described herein.

The embodiments above are intended to be illustrative and not limiting. Additional embodiments are within the claims. Although the present invention has been described with reference to particular embodiments, workers skilled in the art will recognize that changes may be made in form and detail without departing from the spirit and scope of the invention.

The invention claimed is:

1. A movable hand/wrist support in combination with a computer mouse for use on a flat surface, the computer mouse having a base with a lower periphery, the hand/wrist support comprising:
    a primary layer of material of constant thickness defining a top surface, bottom surface, and outer perimeter;
    the primary layer of material having an inside facing surface defining an aperture and a heel portion sized to receive a portion of the heel of a user's hand,
    the aperture sized to surround the lower periphery of the base of the computer mouse when the hand/unit support is on the flat surface and the computer mouse is in the aperture thereby capturing the computer mouse within the aperture and allowing the computer mouse to communicate with the flat surface to control a cursor on a computer screen, the aperture further sized for allowing a gap between the periphery and the inside facing surface of the primary layer around the entire periphery when the computer mouse is seated in the aperture providing a loose fit allowing movements of the computer mouse within the aperture without the need to move the support and allowing larger movements of the mouse by moving the computer mouse along with the hand/wrist support.

2. The combination of claim 1, further comprising a second layer of a different material from the primary layer of constant thickness affixed to the primary layer of material under the primary layer of material.

3. The combination of claim 2, wherein the second layer includes an aperture adapted to allow a computer mouse to communicate with the surface beneath the second sheet of material to control a cursor on a computer screen.

4. The combination of claim 2, wherein the second layer is comprised of a polymer and includes a plurality of additional holes to facilitate lifting the hand/wrist support from the surface.

5. The combination of claim 2, wherein the primary layer of material is thicker than the secondary layer and is deformable upon resting a hand thereon.

6. The combination of claim 3, wherein the lower periphery of the base of the computer mouse is smaller than the aperture of the primary layer of material and is larger than the aperture of the secondary layer such that a bottom surface of the computer mouse rests upon a top surface of the secondary layer when the computer mouse is placed within the aperture of the primary layer of material.

7. The combination of claim 1, wherein when the computer mouse is placed within the aperture in the primary layer and centered therein, a gap of at least 3/32 of an inch is provided all around the periphery of the mouse.

8. The combination of claim 1, further comprising a layer of padding of constant thickness disposed on the top surface of the primary layer of material.

9. The combination of claim 8, wherein the material comprising the layer of padding is selected from the group consisting of leather, suede, microfiber, foam and rubber.

10. The combination of claim 8, wherein the at least one padding layer is permanently attached to the top surface of the first sheet of material.

11. The combination of claim 1, wherein the aperture is larger and of the same general shape as a perimeter of the computer mouse such that both a bottom surface of the computer mouse and the bottom surface of the primary layer of material will both be in operative contact with the flat surface when the hand/wrist support is placed on the flat surface and computer mouse is placed within the aperture.

12. The combination of claim 1, wherein the primary layer of material is comprised of plastic.

13. A movable hand/wrist support kit in combination with a computer mouse, the combination comprising:
    a computer mouse;
    at least one movable hand/wrist support for use with the computer mouse, the movable hand/wrist support comprising:
        a first planar sheet of material of constant thickness defining a top surface, bottom surface, and outer perimeter;
        the first planar sheet of material having a heel portion sized to receive a portion of the heel of a user's hand; and
        an aperture through the first sheet of material adapted to loosely receive the computer mouse therein allowing smaller movements of the computer mouse within the aperture without the need to move the support and allowing larger movements by moving the hand wrist support along with the computer mouse; and
    at least one padding layer with a planar top surface affixed to the first planar sheet of material.

14. The combination of claim 8, wherein the layer of padding has the same outer perimeter as the first sheet of material and an aperture conforming to the aperture through the primary layer of material.

* * * * *